(12) United States Patent
Grover (10) Patent No.: US 11,146,602 B1
(45) Date of Patent: Oct. 12, 2021

(54) USER STATUS DETECTION AND INTERFACE

(71) Applicant: Plantronics, Inc., Santa Cruz, CA (US)

(72) Inventor: Jonathan Grover, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 17/112,057

(22) Filed: Dec. 4, 2020

(51) Int. Cl.
*H04L 29/06* (2006.01)
*H04L 29/08* (2006.01)

(52) U.S. Cl.
CPC ............ *H04L 65/403* (2013.01); *H04L 67/24* (2013.01)

(58) Field of Classification Search
None
See application file for complete search history.

(56) References Cited

U.S. PATENT DOCUMENTS

| | | | | |
|---|---|---|---|---|
| 7,035,923 B1* | 4/2006 | Yakum | H04L 67/24 379/106.01 |
| 7,356,137 B1* | 4/2008 | Burg | H04M 3/42263 379/201.07 |
| 7,603,421 B1* | 10/2009 | Roche | H04L 67/24 709/206 |
| 8,116,788 B2* | 2/2012 | Sarkissian | H04L 67/24 455/456.3 |
| 8,195,319 B2* | 6/2012 | Kristjansson | G06F 3/167 700/94 |
| 8,392,503 B2* | 3/2013 | Kuhlke | H04L 12/1822 709/204 |
| 8,516,105 B2* | 8/2013 | Chawla | H04N 7/15 709/224 |
| 8,880,118 B1* | 11/2014 | Miller | H04L 67/306 455/550.1 |
| 9,060,050 B1* | 6/2015 | Chau | H04L 51/043 |
| 10,382,722 B1* | 8/2019 | Peters | G06K 9/00718 |
| 10,565,565 B2* | 2/2020 | Gentzkow | G06Q 10/06311 |
| 10,586,131 B2* | 3/2020 | Dettori | G06K 9/6269 |
| 10,855,952 B1* | 12/2020 | Rocklin | G06F 3/017 |
| 10,868,999 B2* | 12/2020 | Silveira | H04N 7/141 |
| 10,897,370 B1* | 1/2021 | Schemers | G06Q 10/10 |
| 10,924,709 B1* | 2/2021 | Faulkner | H04N 7/15 |
| 2002/0049709 A1* | 4/2002 | Miyasaki | G06F 16/00 |
| 2002/0172342 A1* | 11/2002 | O'Malley | H04M 3/567 379/202.01 |
| 2003/0058805 A1* | 3/2003 | Meyerson | H04L 51/00 370/260 |
| 2003/0154293 A1* | 8/2003 | Zmolek | H04L 67/327 709/228 |
| 2003/0217099 A1* | 11/2003 | Bobde | H04L 67/306 709/202 |
| 2004/0059781 A1* | 3/2004 | Yoakum | H04L 51/04 709/204 |

(Continued)

*Primary Examiner* — Backhean Tiv
(74) *Attorney, Agent, or Firm* — Ferguson Braswell Fraser Kubasta PC (57) ABSTRACT

A computer implemented method includes gathering metrics from components of a conferencing endpoint in a conference call, and determining status indicator values according to the metrics. The status indicator values each identify a component status of a component. The status indicator values are combined to infer a user status. The computer implemented method further includes generating a description of a user status of a target user with respect to the conference call, and presenting the description of the user status.

19 Claims, 6 Drawing Sheets

(56) References Cited

U.S. PATENT DOCUMENTS

| | | | |
|---|---|---|---|
| 2005/0068905 A1* | 3/2005 | Dorner | H04N 7/147 370/260 |
| 2005/0099492 A1* | 5/2005 | Orr | H04N 7/147 348/14.08 |
| 2006/0053196 A1* | 3/2006 | Spataro | H04L 65/403 709/205 |
| 2008/0034085 A1* | 2/2008 | Chawla | H04L 67/22 709/224 |
| 2008/0084984 A1* | 4/2008 | Levy | H04L 12/1818 379/202.01 |
| 2008/0133580 A1* | 6/2008 | Wanless | H04M 1/72457 |
| 2008/0320082 A1* | 12/2008 | Kuhlke | H04L 12/1822 709/205 |
| 2009/0172100 A1* | 7/2009 | Callanan | G09B 7/02 709/205 |
| 2010/0309284 A1* | 12/2010 | Samadani | H04N 21/42203 348/14.08 |
| 2011/0022968 A1* | 1/2011 | Conner | G06Q 10/109 715/753 |
| 2011/0072128 A1* | 3/2011 | Carr | H04L 67/24 709/224 |
| 2011/0085654 A1* | 4/2011 | Jana | H04L 65/1096 379/220.01 |
| 2011/0191688 A1* | 8/2011 | Hasegawa | G06F 15/00 715/738 |
| 2011/0225013 A1* | 9/2011 | Chavez | G06Q 10/109 705/7.18 |
| 2011/0302253 A1* | 12/2011 | Simpson-Anderson | H04L 51/04 709/206 |
| 2012/0296914 A1* | 11/2012 | Romanov | H04N 7/147 707/741 |
| 2013/0106976 A1* | 5/2013 | Chu | H04N 7/15 348/14.02 |
| 2013/0124623 A1* | 5/2013 | Munter | H04L 65/4038 709/204 |
| 2013/0132480 A1* | 5/2013 | Tsuji | G06Q 10/06 709/204 |
| 2013/0225210 A1* | 8/2013 | Rosener | H04W 4/12 455/458 |
| 2013/0339875 A1* | 12/2013 | Sahai | H04L 12/1827 715/753 |
| 2014/0323099 A1* | 10/2014 | Braudes | H04M 3/42365 455/414.1 |
| 2014/0372517 A1* | 12/2014 | Zuili | G06Q 50/01 709/203 |
| 2015/0172402 A1* | 6/2015 | Steinbok | H04L 67/24 709/205 |
| 2016/0065864 A1* | 3/2016 | Guissin | G06T 5/50 348/239 |
| 2016/0241496 A1* | 8/2016 | Cunico | H04L 67/22 |
| 2017/0177928 A1* | 6/2017 | Cunico | G06K 9/00315 |
| 2018/0227340 A1* | 8/2018 | Jaynes | H04L 65/403 |
| 2018/0337963 A1* | 11/2018 | Faulkner | H04L 67/26 |
| 2018/0343212 A1* | 11/2018 | VanBlon | H04L 51/02 |
| 2019/0147367 A1* | 5/2019 | Bellamy | G06N 20/00 706/12 |
| 2019/0333025 A1* | 10/2019 | Adamson | G06Q 10/063116 |
| 2019/0392204 A1* | 12/2019 | Anders | H04N 7/15 |
| 2020/0258001 A1* | 8/2020 | Peterson | H04L 67/24 |
| 2021/0029207 A1* | 1/2021 | Crocker | G06F 3/011 |
| 2021/0051298 A1* | 2/2021 | Atkins | H04N 7/15 |
| 2021/0056450 A1* | 2/2021 | Catalano | G06N 7/005 |

* cited by examiner

USER STATUS DETECTION AND INTERFACE

FIELD OF INVENTION

The present invention generally relates to conferencing systems.

BACKGROUND

Video conferencing solutions connect users at two or more sites (i.e., physical locations). Each site has a conferencing endpoint. The conferencing endpoint includes hardware and software that capture audio and/or video from the users at the site. For example, the conferencing endpoint may include one or more cameras, microphones, speakers, and display devices along with hardware and software to transmit and receive audio and video signals.

In a virtual conferencing system, users at one site do not see or experience the users' environments at the other sites. Users are limited to images in the video stream, audio responses, and any chat messages. In other words, users at different sites may not see the distractions or level of attentiveness of other users. From a user perspective, receiving the status information of other users would be useful. However, a challenge exists in having hardware and software correctly detect the status under a myriad of conferencing scenarios and systems while automatically providing the requisite level of privacy for the user and scenario.

SUMMARY

In general, in one aspect, one or more embodiments relate to a computer implemented method. The computer implemented method includes gathering metrics from components of a conferencing endpoint in a conference call, and determining status indicator values according to the metrics. The status indicator values each identify a component status of a component. The status indicator values are combined to infer a user status. The computer implemented method further includes generating a description of a user status of a target user with respect to the conference call, and presenting the description of the user status.

In general, in one aspect, one or more embodiments relate to a system that includes a hardware processor, and instructions configured to execute on the hardware processor to perform operations. The operations include gathering metrics from components of a conferencing endpoint in a conference call, and determining status indicator values according to the metrics. The status indicator values each identify a component status of a component. The status indicator values are combined to infer a user status. The operations further include generating a description of a user status of a target user with respect to the conference call, and presenting the description of the user status.

In general, in one aspect, one or more embodiments relate to a non-transitory computer readable medium comprising computer readable program code for performing operations. The operations include gathering metrics from components of a conferencing endpoint in a conference call, and determining status indicator values according to the metrics. The status indicator values each identify a component status of a component. The status indicator values are combined to infer a user status. The operations further include generating a description of a user status of a target user with respect to the conference call, and presenting the description of the user status.

Other aspects will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to detecting a user status at a conferencing endpoint based on status indicator value determined from components of the conferencing endpoint. The status indicator value is only the information captured by the component and the operations of the component. The user status is directed to what the user is actually doing or the user's mindset. By way of a first example, the status indicator value may be that a user's gaze is not facing the camera. The user status may be that the user is taking notes, or that the user is distracted. Disambiguating the user status when the status indicator value indicates multiple options may be based on a combination of status indicator values. For example, a combination of a new email being received and a change in gaze detection is detected as the user is distracted. A combination of audio signal from the user and that the gaze is changed does not indicate that the user is distracted. Rather, the combination may indicate that the user is thinking.

By way of another example, the status indicator value may be that the user is no longer detected as being present in the video stream. The user status may be that a user is on a call, evacuating a natural disaster suddenly, or left briefly.

One or more embodiments monitor the status indicator value. When a change in status indicator value exists, one or more embodiments determine the user status based on one or more of the status indicator values. Based on a change in user status and/or user settings, the user status is presented. For example, the user status may be injected into the audio/visual stream of a conference call.

Figure 1:
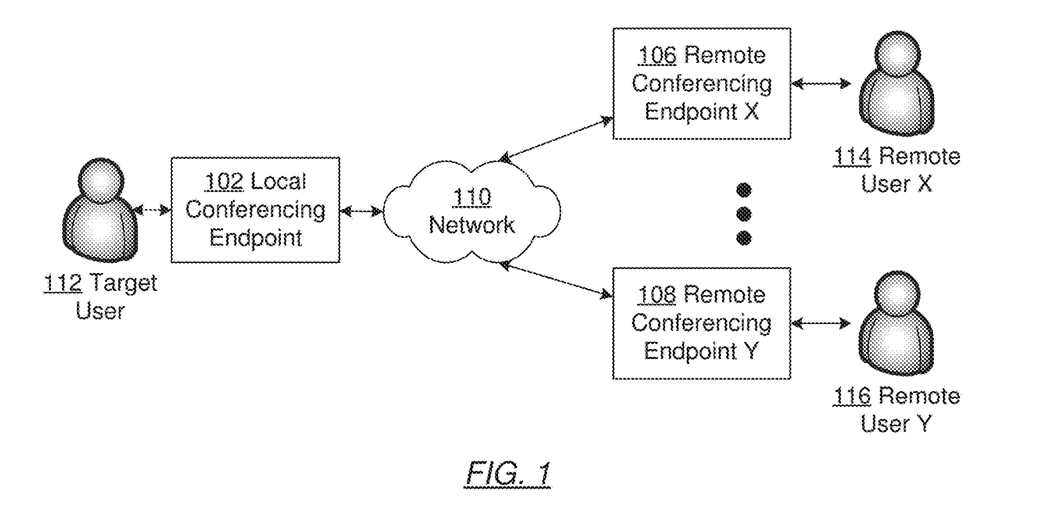
FIG. 1 shows a diagram of a conferencing system in accordance with one or more embodiments.

Turning to the Figures, FIG. 1 shows a diagram of a conferencing system in accordance with one or more embodiments. In general, a conferencing system is a set of hardware and software components that establish a conference call between users. A conference call complies with the standard definition as a real time connection between two or more users located at different sites (i.e., geographic locations). The conferencing system is the set of hardware and/or software that perform real-time connection between audio and/or video streams. Users located at each site view and/or hear other users as the audio and/or video streams are received rather than a prerecording of the other users. Thus, the conferencing system provides a real-time connection between users. The conferencing system includes endpoints (e.g., local conferencing endpoint (102), remote conferencing endpoint X (106), remote conferencing endpoint Y (108)) connected via a network (110). Each conferencing endpoint (e.g., local conferencing endpoint (102), remote conferencing endpoint X (106), remote conferencing endpoint Y (108)) displays and/or plays the audio and/or video streams as the audio and/or video streams are being received and processes and transmits audio and/or video streams while the audio and/or video streams are being received.

With respect to a particular conferencing endpoint, the conferencing endpoint is a local conferencing endpoint (102) and the conferencing endpoints that the local conferencing endpoint (102) communicate with are referred to as remote conferencing endpoints (e.g., remote conferencing endpoint X (106), remote conferencing endpoint Y (108)). Each conferencing endpoint (e.g., local conferencing endpoint (102), remote conferencing endpoint X (106), remote conferencing endpoint Y (108)), whether remote or local, provides local conference call services to one or more users. A user is an individual (e.g., human) that is a party to the conference call. With respect to a local conferencing endpoint (102), the user that is local to the conferencing endpoint is a local user. One or more of the local users may be referred to as a target user (112). The target user (112) is the user for which the user status is detected. Thus, the target user (112) is the user having the user status. With respect to the local conferencing endpoint (102), remote users (e.g., remote user X (114), remote user Y (116)) are users that use the local conference call services of remote conferencing endpoints (e.g., remote conferencing endpoint X (106), remote conferencing endpoint Y (108)). Remote users (e.g., remote user X (114), remote user Y (116)) receive the user status for the target user (112).

Although only a single target user is show in FIG. 1, multiple target users may exist at the same conferencing endpoint. For example, multiple users may be in the same conference room. In one or more embodiments, face detection or a machine learning based classification and/or tracking may be used to track each target user. Thus, target users located in the same conference room may be tracked individually and users statuses detected for the each of at least a subset of the target users.

Each conferencing endpoint (e.g., local conferencing endpoint (102), remote conferencing endpoint X (106), remote conferencing endpoint Y (108)) includes functionality to capture audio and/or video stream from one or more local users (e.g., target user (112)) and/or applications local to the conference endpoint and transmit the audio and/or video stream on the network (110). Thus, each conferencing endpoint may be configured to determine the user status with respect to the one or more target users connected to the respective conferencing endpoint.

The conferencing endpoint further includes functionality to receive one or more audio video streams from remote conferencing endpoints of the conferencing system via the network (110) and play an audio and/or video streams for the one or more local users (e.g., target user (112)) that are local to the conferencing endpoint. Likewise, the conferencing endpoint includes functionality to provide the user statuses of one or more remote users to local user(s).

Although FIG. 1 describes the local user as being the target user, in some embodiments, a remote user may be a target user. In such a scenario, the local conferencing endpoint may monitor an incoming audio and/or video stream from a network and determine the user status of one or more of the remote users. The local conferencing endpoint may present the detected user status of the remote target users locally.

Figure 2:
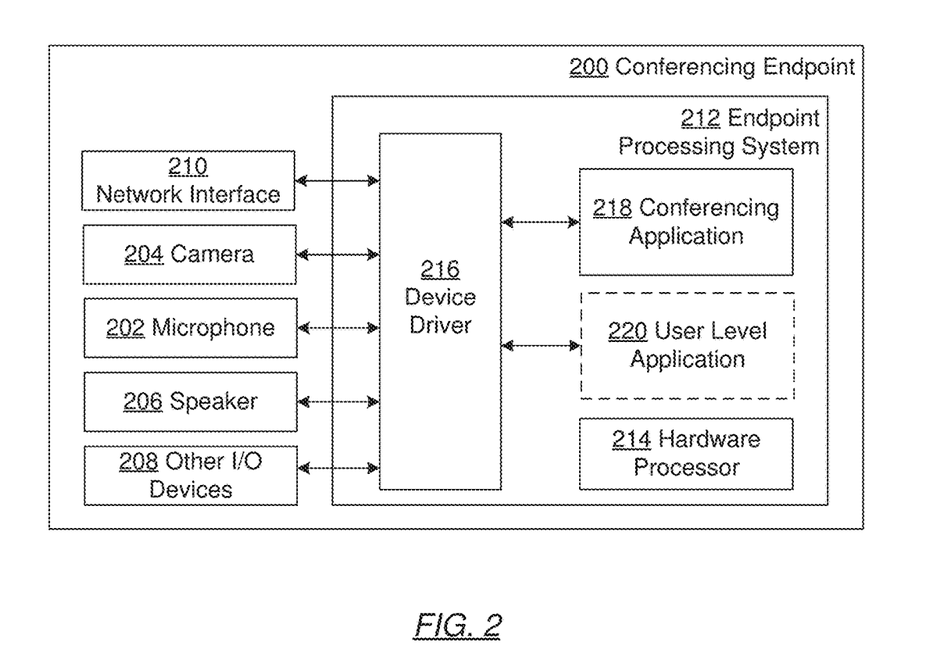
FIG. 2 shows a diagram of a conferencing endpoint in accordance with one or more embodiments.

FIG. 2 shows a schematic diagram of a conferencing endpoint (200) (e.g., local conferencing endpoint (102), remote conferencing endpoint X (106), remote conferencing endpoint Y (108) shown in FIG. 1) in accordance with one or more embodiments. A conferencing endpoint (200) is a type of computer that is configured to generate near-end audio and video and to receive far-end audio and video from the remote conferencing endpoints. The conferencing endpoint (200) is configured to transmit the near-end audio and video to the remote endpoints and to initiate local presentation of the far-end audio and video. The conferencing endpoint (200) can be a conferencing device, a videoconferencing device, a personal computing device with audio or video conferencing abilities, a smartphone, or any similar type of communication device, or any combination of devices. For example, a conferencing endpoint (200) may be a personal computer with an integrated and/or external camera (204), at least one speaker (206), and microphone (202). The speakers (206) and microphone (202) may be integrated into a headset that is worn on the head of a user. As another example, the conferencing system may be a speaker and camera bar, a room conferencing system, or another type of computer that provides conferencing functionality.

The microphone (202) is one or more microphone devices that capture audio and provide the audio to an audio module and codec for processing. The captured audio, with or without additional processing, may be referred to as an audio stream. Specifically, an audio stream is a data stream of audio signals. The microphone (202) can be a table or ceiling microphone, a part of a microphone pod, an integral microphone to the endpoint, or the like. The conferencing endpoint (200) may use the audio captured with the microphone (202) for the near-end audio.

The camera (204) is one or more camera devices that capture video and provide the captured video to a video module and codec for processing to generate the near-end video. The captured video may be referred to as a video stream. The video stream is composed of video frames of near-end video captured by the camera (204), with or without additional processing performed. In general, a video frame (also referred to as a frame) is a single still image in a video feed or video stream, that together with the other video frames form the video stream sent between conferencing endpoints.

The speaker (206) is one or more speaker devices that include functionality to play an audio stream of the conference call. For example, the speakers (206) may be speakers of a headset, integrated speakers in the conferencing endpoint (200) or other type of speakers.

The conference endpoint (200) may include other input output (I/O) devices (208). The other I/O devices (208) include user I/O devices, such as one or more of a display device (e.g., monitor), keyboard, mouse, touchpad, and/or other devices. Additionally, the conference endpoint (200) include a network interface (210). The network interface (210) is an interface between the conferencing endpoint (200) and the network (110 in FIG. 1).

Continuing with FIG. 2, the conferencing endpoint (200) includes an endpoint processing system (212). The endpoint processing system (212) may correspond to and/or include dedicated hardware, a computing system, software executed by one or more processors, a hardware processor (214), or a combination thereof. For example, the hardware processor (214) may include a graphics processing unit (GPU), software executable by the graphics processing unit, a central processing unit (CPU), software executable by the CPU, an image processor (also referred to as an image signal processor (ISP)) that processes raw image data from the camera (204), an application processor that executes applications and other programs of the modules, etc. The various modules, discussed above, may include a CPU or application processor, executable software, or a combination thereof.

The conferencing endpoint (200) uses the codecs to encode the near-end audio and the corrected near-end video according to an encoding standard. Then, the network interface (210) outputs the encoded near-end audio and corrected video to the remote endpoints via the network using an appropriate protocol. Similarly, the network interface (210) receives the far-end audio and video via the network from the remote endpoints and sends the far-end audio and video to their respective codecs for processing. Eventually, a speaker (206) outputs the far-end audio (received from a remote endpoint), and a display device (not shown) outputs the far-end video. The display device also outputs the corrected near-end video in some embodiments.

The endpoint processing system (212) may further include a device driver (216), a conferencing application (218), and a user level application (220). A device driver (216) is a collection of executable instructions that is an interface between an operating system (not shown) and the hardware devices (e.g., camera (204), microphone (202), speaker (206), other I/O devices (208), etc.). Each hardware device, or collection thereof (such as a headset having a microphone and speaker), may have a corresponding device driver. The device driver (216) may be a virtual device driver that connects to actual device drivers in some embodiments. For example, a virtual device driver may be an interface between the operating system and actual device driver in one or more embodiments.

The device driver (216) may be connected, such as via an operating system, to a conferencing application (218). A conferencing application (218) is a user level software tool that establishes and controls a conference call. The conferencing application (218) is a meeting application for online meetings. Example conferencing applications include Zoom application by Zoom Video Communications, Inc. located in San Jose, Calif., Microsoft Teams® application developed by Microsoft Corporation, located in Redmond, Wash., WebEx® application developed by Cisco Corporation, located in San Francisco, Calif., or other meeting software applications.

In some cases, the endpoint processing system (212) may include other user level applications (220), such as a calendaring program, an email application, a word processing application, or other application that is configured to generate a notification or otherwise interface with other components of the endpoint conferencing system.

As shown, the conferencing endpoint (200) includes various components, such as the network interface (210), camera (204), microphone (202), speaker (206), other I/O devices (208), device drivers (216), conferencing application (218), hardware processor (214), and user level application (220) amongst other components not shown. The metrics collected from one or more components are used directly to determine a status indicator value. The status indicator value is a data point that is a clue as to the user status. As such, the status indicator value is an indication of the user status of the target user even though the status indicator value may not be dipositive of the user status. Thus, the status indicator value is an intermediate value between the raw data from the component and the estimation of the user status as derived from one or more status indicator values.

In some embodiments, the status indicator value is directly obtainable from the component (e.g., metric of the component). In other words, the status indicator value is directly identifiable (e.g., defined) in the output or setting of the corresponding component. For example, the status indicator value may be the direction of eye gaze of a video frame of the user, the current connection status of a device, whether a new email is received, the amount of noise of a keyboard typing, or other such status. The connection status is used to determine user status of the target user.

The user status is a status of a user that is determined based on inference. For example, the user status is determined from one or more status indicator values. In one or more embodiments, the user status is determined by a user status detector.

Figure 3:
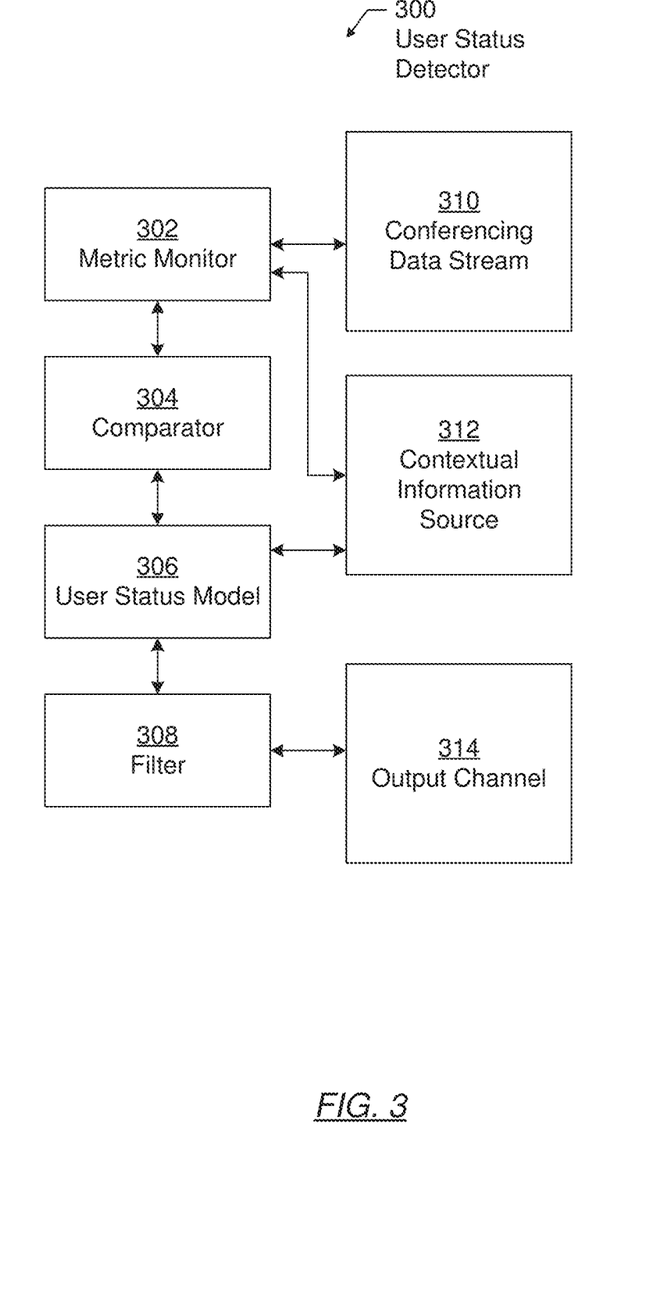
FIG. 3 shows a diagram of a user status detector in accordance with one or more embodiments.

FIG. 3 shows a diagram of a user status detector (300) in accordance with one or more embodiments of the technology. As show in FIG. 3, the user status detector (300) includes a metric monitor (302), a comparator (304), a user status model (306), and a filter (308). The metric monitor (302) includes functionality to monitor the conferencing data stream (310) and/or a contextual information source (312). The conferencing data stream (310) being monitored may include the audio stream, the video stream, a chat stream, or any combination thereof.

The metric monitor (302) may further monitor a contextual information source (312). The contextual information source (312) is a source of contextual information that provides context for the data stream. For example, the contextual information source (312) may be a user level application (described above with reference to FIG. 2), keyboard output, or other source of contextual information.

From the monitoring, the metric monitor (302) includes functionality to obtain metrics from a component of the conferencing endpoint. The metric is a unit of data that is generated by or a configuration of from a component. For example, a metric may be an audio stream or a video stream, a connected device of the component, a configuration, an open window, a notification, or other output. The metric monitor (302) is further configured to generate a status indicator value based on the metrics. In some embodiments, the status indicator value may be determined from the metrics provided by another component. For example, a keyboard status of how fast a user is typing may be determined from an audio stream from a microphone. The status indicator value may be connected to multiple status detectors. For example, an image object detector (not shown) may identify objects in the video stream. In such a scenario, the image object detector may include a convolution neural network training to classify objects in video frames. By way of another example, an audio detector may include an audio isolator configured to isolate different object audio streams of audio from the audio stream, and an audio object detector configured to classify the objects in the isolated audio streams.

The comparator (304) is configured to compare the detected status indicator value to determine whether a change in status indicator value exists. In one or more embodiments, the comparator (304) maintains thresholds for each status indicator value, whereby the threshold indicates the amount of change to be considered a change in status indicator value. Thresholds may be percentage thresholds or absolute amount thresholds. Percentage thresholds are thresholds on the percentage change in the status indicator value. Absolute amount thresholds are a direct threshold on the amount of change.

The comparator (304) may include one or more thresholding models that the computer iteratively adjusts to dynamically set the threshold. Namely, the computer iteratively learns the threshold to apply to each of the status indicator values.

The user status model (306) is a computer model configured to transform the status indicator value to a user status. As discussed above, the status indicator value is explicitly present in the metrics. In contrast, the user status is an inferred status estimated from the status indicator value. Because the computer cannot positively identify the user's status as multiple user statuses may correspond to the same set of status indicator value, the user status is estimated. To perform the estimation, the user status model (306) may be a set of rules. As another example, the user status model (306) may be a neural network. The features used as input to the neural network include the status indicator value. The features may further include information about a user, such a user identifier, role, or other status information. The output of the neural network for the user status is a classification of the user status The filter (308) includes functionality to filter the user status based on user and device settings. Specifically, the filter (308) ignores user status that does not comply with privacy settings in one or more embodiments. Further, in one or more embodiments, the filter may ignore user status that does not represent a change in a status. In one or more embodiments, the filter (308) includes functionality to generate a natural language version of the user status. For example, the filter (308) may include a natural language processor. The natural language processor transforms the computer encoded status to a natural language status (e.g., in sentence form).

The output channel (314) is the medium by which the target user status is transmitted to remote users. For example, the output channel (314) may be a private or broadcast chat channel, an overlay on the video stream, a notice on an audio stream, or another notification medium.

While FIG. 3 shows a diagram of the user status detector and a configuration thereof, other configurations may be used without departing from the scope of the technology. Further, the user status detector (300) may be implemented on a variety of components. For example, the user status detector (300) may be implemented in hardware, in software, or in a combination thereof. In hardware, the user status detector (302) may be implemented in a device having an integrated microphone, speaker, and/or camera. In such a scenario, the user status detector (300) is configured to inject the user status into the audio and/or video stream, whereby the audio and/or video stream is the output channel (314). As another example, the user status detector (300) may be implemented in a virtual device driver that executes on a processor connected to input output components. As with the hardware, the user status detector (300) in the virtual device driver may inject the status into the audio and/or video stream. As another example, the user status detector (300) may be implemented in software that interfaces with the conferencing application. In such a scenario, the user status detector (300) may transmit the user status to the conferencing application to inject into the audio, video, and/or chat stream. Other locations for the user status detector (300) may exist without departing from the scope of the technology.

Figure 4:
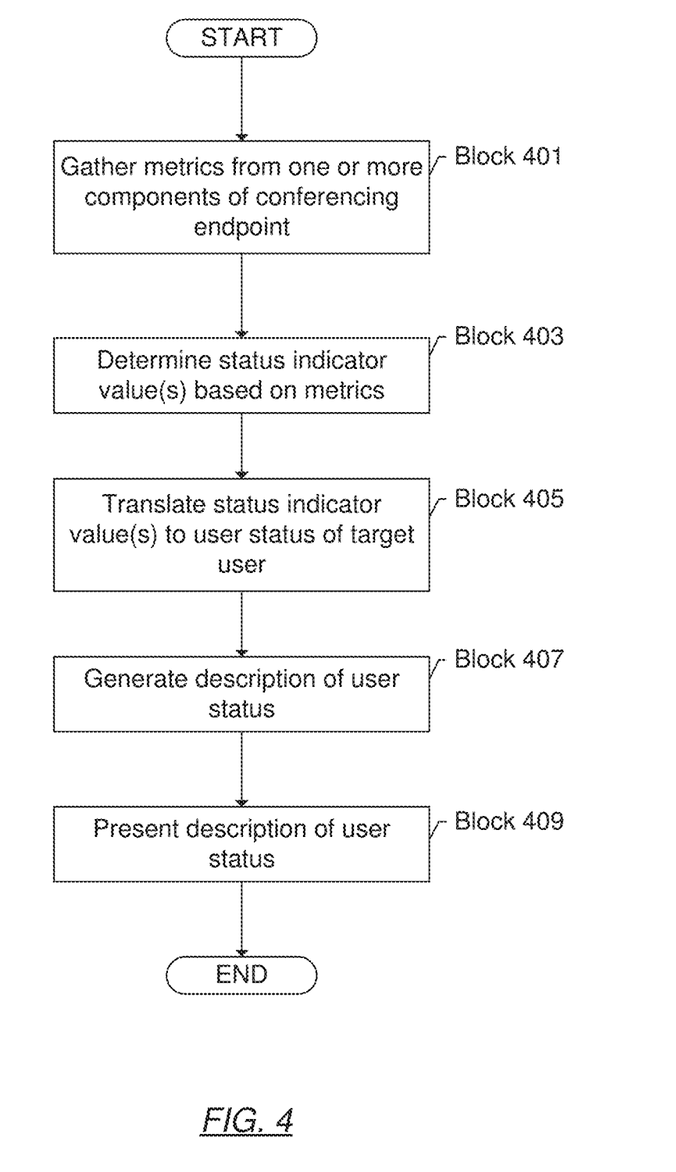
FIG. 4 shows a flowchart in accordance with one or more embodiments.
Figure 5:
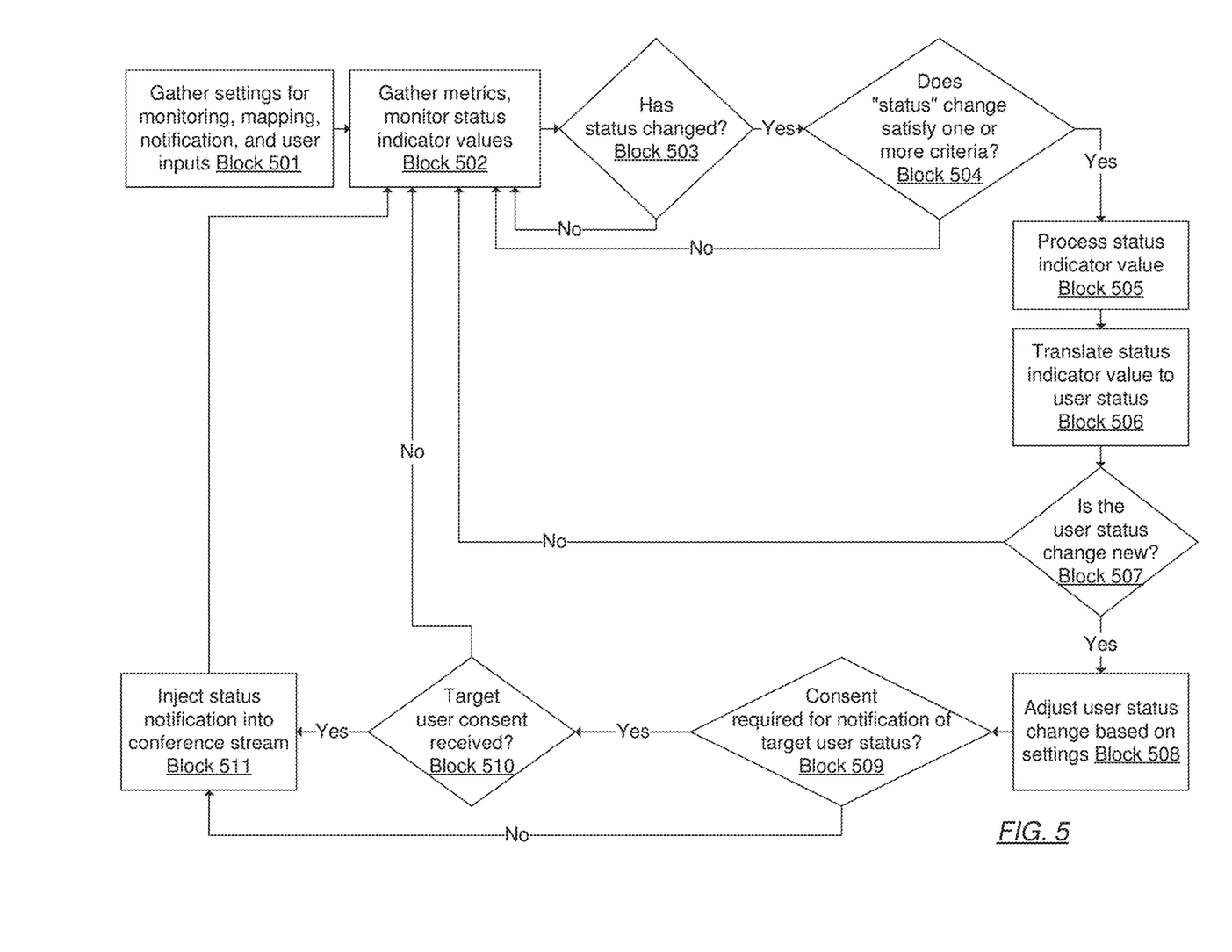
FIG. 5 shows a detailed flowchart in accordance with one or more embodiments.

FIGS. 4 and 5 show flowcharts in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 4, FIG. 4 shows a flowchart for user status detection in accordance with one or more embodiments. In one or more embodiments, user status detection is performed periodically by the local conferencing endpoint. For example, the user status detection may be performed every 5-30 seconds or longer. The user status detection may be performed by a component of the local conferencing endpoint. As another example, the user status detection may be performed by a component of the remote endpoint using status indicator values detected in the audio and/or video stream.

At Block 401, metrics from one or more components of the conferencing endpoint are gathered. The gathered metrics are dependent on the location of the user status detector. For example, if the user status detector is located on only an audio device, then the gathered metrics may only be an audio stream that is intercepted from the microphone and configuration information for the audio device (e.g., connection information). Similarly, if the user status detector is located on a video only device, the gathered metrics are only a video stream intercepted from a camera, and the configuration information of the video device. When located on a virtual device driver that is connected to multiple device drivers, the gathered metrics may include any data stream through the multiple device drivers. When the user status detector is located, in whole or in part, on the endpoint processing system and connected to one or more user level applications, the user status detector may access the application programming interface (API) of the user level applications to obtain metrics. The metrics from the user level applications may include notifications of new emails received, meetings in a calendar, whether the user is updating the user level application, and other information.

Figure 6A:
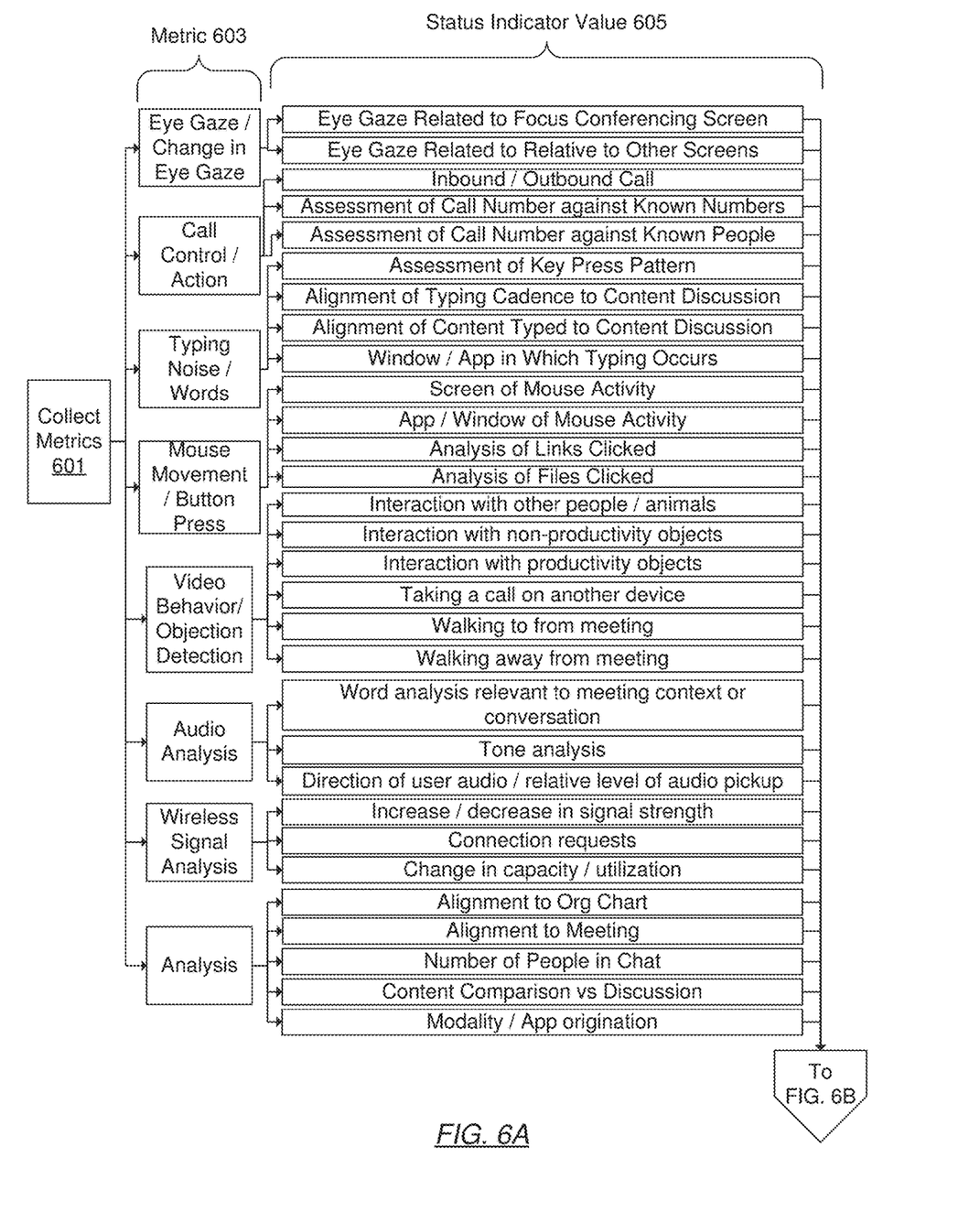
FIG. 6A and FIG. 6B show an example, in accordance with one or more embodiments.

At Block 403, status indicator value is determined from the metrics. The metric monitor processes each metric to extract the status indicator value. For example, for video stream processing, the metric monitor may perform person detection of a video frame to detect the presence and/or location of a person in the video stream. As another example, the metric monitor may perform gaze detection to detect the direction of a person's gaze. Gaze detection and person detection are performed using machine learning techniques, such as the techniques that are known in the art. In the above example, the status indicator value is the detected gaze or the location of the person. In another example, the status indicator value may be typing speed. In such a scenario, the status indicator value may be determined based on audio from the audio stream. FIG. 6A shows examples of how different status indicator values may be determined from different gathered metrics.

Continuing with FIG. 4, at Block 405, the status indicator value is translated to a user status of a target user in one or more embodiments. In one or more embodiments, multiple status indicator values are combined using heuristics to infer the user status. Multiple status indicator values may be mapped to multiple possible user statuses with a corresponding probability of each status. In such a scenario, the highest probability status is selected. The combination may be rule based, based on a Bayesian classifier, using a neural network model, or through another technique. For example, features of the various status indicator values may be used as input to the neural network model, whereby the neural network model is trained to predict the classification of the user status. The classification of the user status is to the set of possible user statuses available. The neural network model may be iteratively adjusted based on input from the target user. For example, when the user returns, the user may review the user status provided and accept or reject the status as being accurate. Through continuous training for the particular target user, the neural network model learns the status indicator values that cause a particular user status.

Similarly, a Bayesian classifier may be used to predict the class of the user status based on the status indicator value. A Bayesian classifier may be trained based on detected probabilities of each status indicator value being indicative of a particular user status.

By way of an example of determining user status from multiple status indicator values, the headset no longer being connected to the computer having the conference call (e.g., headset status indicator value) may give a first probability that the user is on a different phone call, gaze detection (e.g., camera based status indicator value) changing to a user looking downward may give a second probability that the user is on the different call, typing speed (e.g., keyboard based status indicator value) may give a third probability that the user is on a different phone call. The first probability, second probability, and third probability may be combined to create a total probability that the target user is on a different phone call. In isolation, each of the status indicator values may not be sufficient to determine that the target user is on a different phone call. For example, a status indicator value from the headset indicating that the headset is no longer connected may indicate that the user simply switched audio devices. A gaze detection of looking downward may indicate that the user is thinking. Further, slower typing speed may indicate that the user has paused taking notes because the user is talking. Thus, as shown, each status indicator value is inconclusive that the target user is on a different phone call. However, taken together, the probability is much higher, and an inference can be made that the target user is on a different phone call. Thus, the target user does not need to notify the remote users of the change in status, as the user status detector is able to infer and provide this information.

At Block 407, a description of a user status is generated. In some embodiments, a mapping rule is applied to the user status to generate the description of the user status. For example, the mapping rule may specify that for a particular user status, the output is a predefined description. The mapping rule may further be defined based on a privacy settings level for the target user. For example, the target user may specify to provide a generic status from a predefined set of status identifiers (e.g., "on call", "left meeting", "paying attention", etc.), or a specific status (e.g., "<Target user name> is on a call with <name of person who is on the call>").

A natural language processor may execute using the user status and a set of settings to generate a natural language description of the user status. The natural language processor accounts for the user privacy settings. Based on privacy settings, the user status description may be specific, be less specific with some details generalized, to even less specific with most details obfuscated, to being general. By way of an example, if the user is Ms. Jane Jones, the user status depending on privacy settings may be one of "Jane is on a call with Dr. Smith," "Jane is on a call with a doctor," "Ms. Jones is on a call," and "Ms. Jones is unavailable." The generation of the user status may further include determining the remote users on the call to receive the user status. For example, from the conferencing application or using face detection in the video stream, the remote users may be identified. Based on identifiers or roles of the remote users, the corresponding privacy settings matching the identifiers or roles are identified. From the corresponding privacy setting, the description matching the privacy setting is generated.

At Block 409, the description of the user status is presented. The description may be overlaid on the video stream (e.g., on several frames of the video stream) so as to be a part of the video stream. By overlaying the status, the user status is transmitted to each of the remote users as integrated in the video stream. Thus, each of the remote users is able to view the availability of the target user. Similarly, the user status may be added to the audio stream in the conference call from the target user to the remote users.

The user status detector may interface with the conferencing application, such as in the API of the conferencing application, to update a direct or broadcast chat channel of the conferencing application. In another example, the user status detector may interface with another user level application (e.g., an email application, a chat application) to notify a set of remote users with the description of the user status. In some embodiments, only a portion of the remote users receive the description of the user status. For example, the user status detector may select, using an API of the conferencing application, a selection of remote users to receive the user status description. The selection may be the set of remote users that are internal to a company of the target user, for example, when the conference call includes internal and external users (e.g., customers and/or vendors of the company). As another example, the selection may be the set of remote users having a particular role (e.g., on an executive committee or having another role).

From a technical perspective, one of more embodiments create a computer that is capable of inferring a user status from status indicator value. Such user status may not be inferable by remote users. For example, if the video stream is cropped to a target user or not being displayed, remote users may not see other items in the target area that have the target user's attention. Similarly, if the target user is muted, remote users may not see that the target user is speaking to someone else. Thus, by automating the inference of user status, the user interface of the conferencing application provides more information than the conferencing application was previously able to present. From a user perspective, users to the conference call can, using the user status, determine whether to discuss particular topics (e.g., if relevant to the target user), decide to delay the conference call, or know that the target user is no longer able to answer questions.

FIG. 5 shows a continuous flowchart for user status detection in accordance with one or more embodiments. Specifically, FIG. 5 is focused on notification based on user status. At Block 501, settings for monitoring, mapping, notification, and user inputs are gathered. Predefined settings may exist, such as policy settings. Further, user defined settings may exist that are defined on a global basis (all meetings), on a meeting by meeting basis, or deliver user defined setting on a per remote user basis. Additional embodiments defining how settings are delivered exist. Further additional settings categories may be gathered. For example, for monitoring settings category, the settings define the metrics that are monitored, the frequency of monitoring, and sensitivity to detect status changes. Mapping settings category defines how status indicator value is mapped to user status. Notification settings define the frequency to provide notifications, whether target user input is required for the notification, and modality of notifications. User input settings include privacy related settings, personally identifiable information related settings, and data sharing settings.

Block 502 is directed to gathering metrics and monitoring status indicator value(s). As discussed above, status indicator value is a status that is determined from metrics for one or more components. Consider an example where a status indicator value is measured in a user's state: (i) Attentiveness, (ii) On a secondary call. Attentiveness is determinable from video monitoring. On a secondary call is determinable based on connection information. In an absolute case, the possible status indicator value may be a deterministic flag (such as yes/no). For example, attentiveness may be a yes and on a secondary call may be a no. As another example, a probabilistic score may be applied. In the probabilistic score case, attentiveness and on a secondary call are assigned probability values (e.g., 87% and 6%, respectively). In a range embodiment, possible status indicator value is provided a numerical representation of a range of possible values. For example, attentiveness may be a 9 and on a secondary call may be a 1, when the range is from 1-9. In a hybrid model, various status indicator values are assigned a value based on the type of status indicator value. For example, attentiveness may be given a value of 7 in a range, and on a secondary call has a value of no.

Contextual monitoring may be performed. For example, to determine the purpose of a user looking at a secondary monitor that is not the call monitor, a user level application displayed on the secondary monitor may be identified to determine the type of application or whether a new message is received.

At Block 503, a determination of status change is performed. One or more embodiments compares the status indicator value at time T (current time) to the status indicator value at a previous time (e.g. T−1) and determines if the status indicator value has changed. Thus, the comparison of two different "statuses" may be done by comparing individual status indicator values, or by aggregating the status indicator values and comparing the aggregation. Individual comparisons consider each status indicator value individually. If any status indicator values indicates a change, then a change is determined to exist. In contrast, aggregating status indicator values combines two or more of the status indicator values according to an aggregation function. The aggregated value is compared and a determination is made whether the status changed. Given that there are various embodiments of how status indicator value is determined, the comparison may use a variety of different logic in comparing "like" data points. Similarly, one or more embodiments may use a variety of different thresholds to determine when the status indicator value detector has detected a change. Thresholds for sensitivity may be set as a configuration or determined. For example, based on distributions of results, the threshold may be determined. The threshold may be saved in the settings in accordance with one or more embodiments.

For example, a change in absolute value status indicator values is detected as a change. A change in a status indicator value of a percentage amount is a change depending on sensitivity. For example, if a 1% change is high because the status indicator is sensitive to change, then an 88-90% change is detected as a change. In contrast, if the sensitivity of a status indicator indicates that a 10% change is considered low (i.e., not much of a change), then an 88-90% change is detected as not a change.

At the conclusion of Block 503, determination is made based on the data analyzed as to whether the status indicator value(s) has changed. If not, the solution continues monitoring for a change. If so, the solution proceeds to Block 504.

At Block 504, a determination is made whether the status change satisfies one or more criteria. Specifically, at Block 504, a determination is made whether a status indicator value change actually existed whereby such change is enough to notify of the change. Specifically, whereas Block 503 makes a determination that the status indicator value indicates a change in user status, Block 504 whether the change in user status exists over time and sufficiently in magnitude.

For example, consider the scenario when the status indicator value over five periods is 85%, 87%, 88%, 87%, 85%. At Block 503, across the delta between the latest data point (85%) and the previous (87%), a determination is made that there was a change significant enough to progress to Block 504. However, in this implementation of Block 504, long term sustained change in status indicator value between the latest time—85%—and T-4 periods ago—also 85% should exist. Thus, at Block 504 in the example, no change is detected. Specifically, the sufficiency over time does not exist.

In another example, the status indicator value over the previous five periods of time measured 85%, 87%, 86%, 87%, and 89%. Across the delta between the latest data point (89%) and the previous (85%), a sufficient change existed to detect a status indicator value change.

Although the above uses sufficiency and length of time of change, other criteria may be used. For example, other criteria may be the trend of the change (e.g., increasing or decreasing) without an inflection.

Multiple status indicator values may be combined. Based on a single status indicator value, insufficient data may exist to detect a status change of user status. Thus, multiple status indicator values are identified, and trends of the multiple status indicator values are determined.

In an algorithmic embodiment, the combination of status indicator values is predefined in one or more formulas. The calculation of the formulas with the status indicator value combine the status indicator values.

In the machine learning embodiment, a series of machine learning models are trained to produce a determination of status indicator value change based on the input data provided to the machine learning model.

In a heuristic embodiment, an algorithm or machine learning model is applied, which, while insufficient to produce a definitive yes/no answer for status change, is able to provide sufficient output at high enough probability for a conclusion of a user status change.

At the end of Block 504, a determination is made that no status change existed (and thus proceeds back to Block 502 to continue monitoring) or that a status change existed (and thus proceeds to Block 505).

At Block 505, any transformations to the status indicator value is processed. Further, external data is aligned to interpret the status indicator value. For example, the external data may be an alert, such as an emergency alert, or other notification that indicates why the target user may not be available. As another example, the external data may be from a calendar application indicating a conflicting meeting. Further, status data points may be grouped to be interpreted for notifications. Erroneous/extraneous data points may be removed.

At Block 506, transformation of the output of Block 505 is performed to translate the status indicator value to a user status with description. For example, consider the following. The status indicator values that are indicative of a status change are (i) a change in Bluetooth audio path, (ii) a change in the audio being transmitted from the headset to the meeting, (iii) a video (behavioral recognition) that the user is now holding their mobile phone, while the conference call meeting is on the computer. These status indicator values do not explain to a human what the change in the user status actually is. However, in Block 506, the status indicator values are translated to a notification status that provides the human level notification "The user has taken another call."

At Block 507, a determination is made whether the user status change is new. For example, consider the scenario in which a status indicator value indicates that the user is on a different call. The remote users are notified. Subsequently, an additional status indicator value determined from another component indicates that the user is on a different call. Because the user status has not changed, even though the status indicator values have changed, the remote users are not notified. The processing returns to Block 502. If the user status has changed, the processing proceeds to Block 508.

In Block 508, the notification output from Block 507 is adjusted to the settings around privacy and notifications. The adjustment is performed to make any modification for security and privacy, adjust the participants that can receive the notification, and include or redact personally identifiable information. Further, recording of the meeting may be considered in order to adjust the notification to comply with policies related to such recording.

At Block 509, a determination is made whether user consent is required. For example, the conferencing endpoint may be configured to require consent or not require consent. If consent is required, the flow proceeds to Block 510 to determine whether the consent is received. If the consent is not required or if consent is received, then the status notification is injected into the conference stream at Block 511. If the consent is not received or after the status injection, the flow returns to Block 502. Thus, the flow may repeat until the end of the conference call.

Figure 6B:
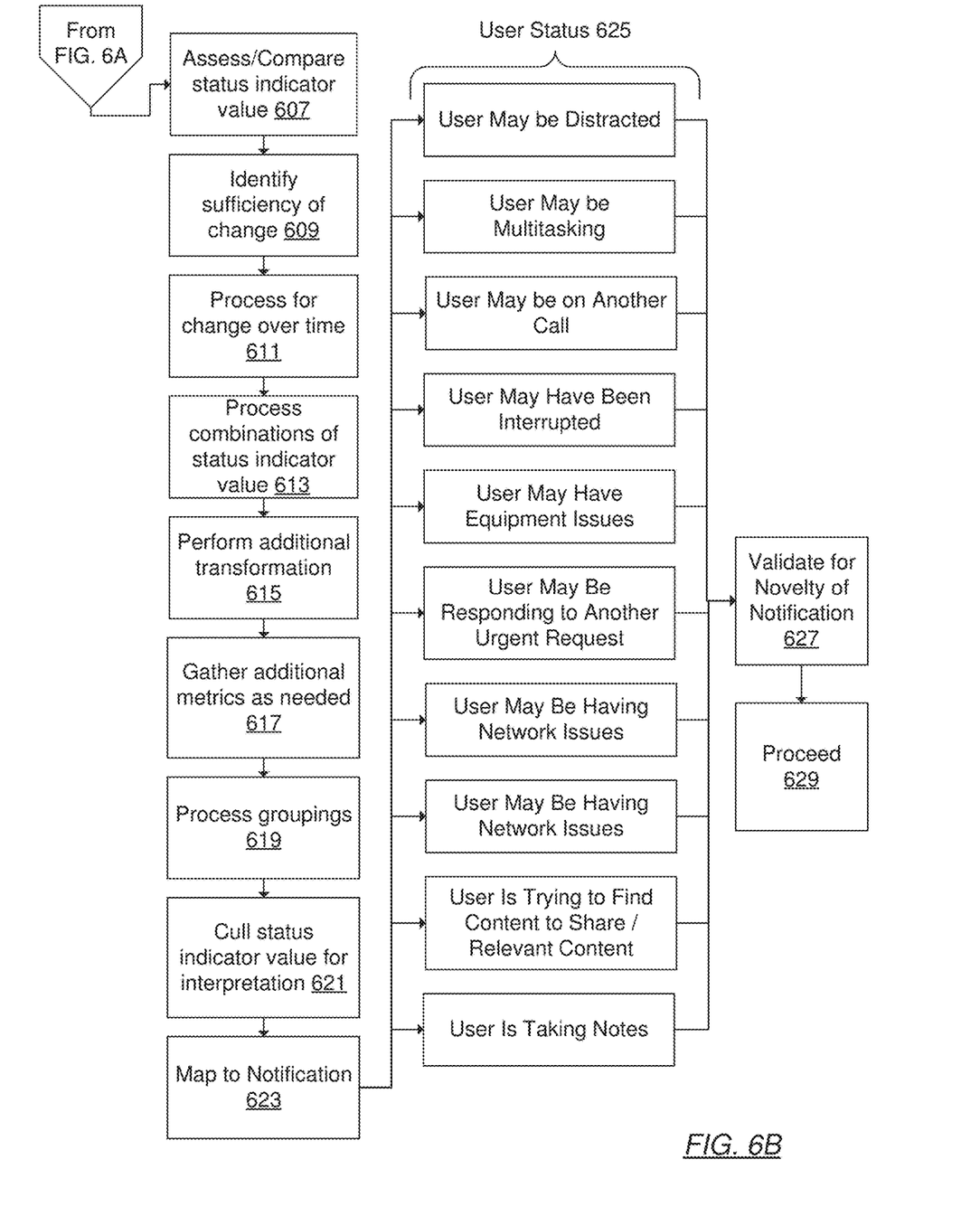

FIGS. 6A and 6B show an example in accordance with one or more embodiments. At 601, metrics are collected and analyzed at element 603. The various analysis of the metrics at 603 are used to create the various status indicator values listed in list 605. The lines between the analysis of the metrics 603 and the corresponding status indicator value in the list 605 indicate which analysis may be used to derive which status indicator value. For example, eye gaze and change in eye gaze analysis may be used to determine status indicator value of eye gaze related to focus on display screen with conference or focus on a different screen. Mouse movement and button press may be used to identify the screen with the mouse activity, the number of clicks, files or links clicked, etc.

Turning to FIG. 6B, the various status indicator values of 605 are assessed and compared at 607. Sufficiency of change of status is identified at 609 and change over time is processed at 611. At Block 613, combinations of status indicator values are identified. Any additional transformation is performed at Block 615. At Block 617, additional metrics are gathered. Groupings of metrics and status indicator values are processed at Block 619. The status indicator value may be culled for interpretation at Block 621. At Block 623, the status indicator value is transformed to a user status and a description is generated. List 625 presents an example set of possible user statuses. The user status is validated for novelty of notification at Block 627 and, at Block 629, the user status detector proceeds to present the notification.

In one or more embodiments, transformation may be optionally performed. For example, the message meaning may be transformed. An example transformation is from "The user has taken another phone call" to "The user is multi-tasking." Further, "The user is having trouble connecting to audio" may be transformed to a more simplified message that preserves meeting flow, while obfuscating notification details, such as "The user is temporarily away from the meeting."

Message content may be transformed, such that a portion of the message is changed specifically. For example, the message "John Smith has taken another call" may be changed to "The user has taken another call."

The description may be split and presented on different output channels. For example, one group of remote users may receive that the target user received a call from John Smith and another group of remote users may be that the target users had to step away momentarily. Likewise, split descriptions may be used to transmit on different output channels. For example, some remote users receive the description via audio stream and other remote users receive the description via the video stream.

Consent for notification delivery is performed. The consent may be provided in response to an on-screen prompt. The prompt may be visual or audio. A target user may respond in the affirmative via button press, typing, swiping, tapping, or verbally indicating consent.

The notification may be via the conferencing application. For example, integration with the conferencing application may allow for the passing of notification data, along with the appropriate parameters to the conferencing application, and expecting the conferencing application to perform the notification.

The notification may be presented via the video stream. For example, a text overlay shown on the video stream may be applied (e.g. an augmented reality text overlay), or a text overlay shown on a blurred/colored/custom background. Further, a transformation may be performed on the video stream to draw attention to the notification. Such transformation may include flashing the video feed or changing the color, etc.

In some cases, the notification is presented via the audio stream. For example, a particular tone may be played.

The notification may be performed on a person by person basis or uniformly. If uniformly, a single technique of inserting the notification would be used for all participants. If on a person by person basis, the solution might customize what type of notification each remote user receives based on the remote user's modality of joining the meeting (e.g. someone joined via video would see the visual notification, while someone joined via phone would get the audio notification). In another embodiment, one or more embodiments may account for not interrupting the active speaker/presenter, by either delayed the notification for them or not performing an intrusive notification (i.e. playing an audio notification to them while the speaker is talking).

Consider the following user example. James Smith joins a call with ten people on a headset and begins talking. All of a sudden, a call comes in on his cell phone, which he chooses to answer. Nearly instantaneously, the following happens. One or more embodiments interprets the status change implied by that call data input, as well as the video behavioral input to "understand" that the James is on another call. One or more embodiments align data from that call with the organization's active directory to determine that this is a call from the James' boss, the head of product. One or more embodiments validate that the call was not scheduled (per James' calendar). Then, one or more embodiments processes and determines that the appropriate notification message is "James Smith has had to take an urgent call." By validating settings, one or more embodiments determine that automated action may be performed. Thus, the notification is added to James Smith's video feed (via hardware)—displayed the notification text on screen, in front of a blurred background. The meeting continues seamlessly, with all participants now aware that James is not currently present, but without having been interrupted.

After a few minutes, James Smith ends the call (the solution that has been monitoring and is aware of this based on the call state). James is now listening to the meeting again via the headset but has wandered into another room. One or more embodiments flash a color on James Smith's video input and overlays a new notification message on a blurred background ("James Smith is now back in the meeting but cannot see the screen.") After another minute, James comes back to his seat. The solution detects this via video camera and now removes all overlaid notifications on his video input—the video is now a live feed of James in his seat. Thus, as shown in the example, the meeting's productivity and flow has been enhanced by the solution for all the far end participants, and James has been saved from some awkward situations.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer implemented method comprising:
    gathering a plurality of metrics from a plurality of components of a conferencing endpoint in a conference call;
    determining a plurality of status indicator values according to the plurality of metrics, the plurality of status indicator values each identifying a component status of a component of the plurality of components, wherein determining a plurality of status indicator values comprises:
        detecting a headset status of a headset, the headset status being the headset is disconnected from a computer, and
        detecting a video status of a video stream excluding a user, wherein the plurality of status indicator values comprises the headset status and the video status;
    combining the plurality of status indicator values to infer a user status,
        wherein combining the plurality of status indicator values comprises combining the headset status and the video status to determine the user status of an attentiveness change of a target user;
    generating a description of the user status of the target user with respect to the conference call; and
    presenting the description of the user status.

2. The computer implemented method of claim 1, further comprising:
    determining a difference between a first status indicator value in the plurality of status indicator values with a second status indicator value, the second status indicator value being acquired for a time frame prior to the first status indicator value; and
    determining that the difference satisfies a criterion,
    wherein generating the description is in response to the difference satisfying the criterion.

3. The computer implemented method of claim 1, further comprising:
    detecting that the user status changed from a prior user status; and
    creating the description of the user status based on detecting that the user status changed.

4. The computer implemented method of claim 1, further comprising:
    adjusting the user status based on a privacy setting of a user to create an adjusted user status,
    wherein the description of the adjusted user status is presented.

5. The computer implemented method of claim 1, further comprising:
    obtaining user consent of the target user prior to presenting the user status.

6. The computer implemented method of claim 1, wherein presenting the description comprises injecting the description in an audio video conference stream.

7. The computer implemented method of claim 1, further comprising:
    receiving a video stream from a camera, wherein the plurality of components comprises the camera; and
    detecting, in the video stream, a location of the target user, wherein the plurality of status indicator values comprises the location of the target user.

8. The computer implemented method of claim 1, further comprising:
  detecting an audio status an audio device, the audio status being a lack of audio signal on the audio device; and
  detecting a video status of a video stream comprising the target user speaking, wherein the plurality of status indicator values comprises the audio status and the video status,
  wherein combining the plurality of status indicator values comprises combining the audio status and the video status to determine the user status of the target user being on a different call.

9. The computer implemented method of claim 1, further comprising:
  detecting a video status of a video stream comprising the target user speaking, wherein the plurality of status indicator values comprises an audio status and the video status; and
  detecting a user level application status of a new notification, wherein the plurality of status indicator values comprises the user level application status and the video status,
  wherein combining the plurality of status indicator values comprises combining the user level application status and the video status to determine the user status of the target user being distracted.

10. The computer implemented method of claim 1, further comprising:
  generating a probabilistic score of the plurality of status indicator values; and
  determining whether the probabilistic score satisfies a sensitivity criterion.

11. The computer implemented method of claim 10, further comprising:
  training a sensitivity model using a plurality of input training data of at least one component of the plurality of components; and
  generating the sensitivity criterion from the sensitivity model.

12. A system comprising:
  a hardware processor; and
  instructions configured to execute on the hardware processor to perform operations, the operations comprising:
    gathering a plurality of metrics from a plurality of components of a conferencing endpoint in a conference call,
    determining a plurality of status indicator values according to the plurality of metrics, the plurality of status indicator values each identifying a component status of a component of the plurality of components;
    wherein determining a plurality of status indicator values comprises:
      detecting a headset status of a headset, the headset status being the headset is disconnected from a computer, and
      detecting a video status of a video stream excluding a user, wherein the plurality of status indicator values comprises the headset status and the video status,
    combining the plurality of status indicator values to infer a user status,
    wherein combining the plurality of status indicator values comprises combining the headset status and the video status to determine the user status of an attentiveness change of a target user,
    generating a description of the user status of the target user with respect to the conference call, and
    presenting the description of the user status.

13. The system of claim 12, wherein the instructions are part of a virtual device driver, the virtual device driver connected to at least one component of the plurality of components.

14. The system of claim 12, wherein the instructions execute on at least one component of the plurality of components.

15. The system of claim 12, wherein the instructions execute on a conferencing application.

16. The system of claim 12, the operations further comprising:
  detecting that the user status changed from a prior user status; and
  creating the description of the user status based on detecting that the user status changed.

17. The system of claim 12, the operations further comprising:
  adjusting the user status based on a privacy setting of a user to create an adjusted user status,
  wherein the description of the adjusted user status is presented.

18. A non-transitory computer readable medium comprising computer readable program code for performing operations comprising:
  gathering a plurality of metrics from a plurality of components of a conferencing endpoint in a conference call;
  determining a plurality of status indicator values according to the plurality of metrics, the plurality of status indicator values each identifying a component status of a component of the plurality of components, wherein determining a plurality of status indicator values comprises:
    detecting a headset status of a headset, the headset status being the headset is disconnected from a computer, and
    detecting a video status of a video stream excluding a user, wherein the plurality of status indicator values comprises the headset status and the video status;
  combining the plurality of status indicator values to infer a user status,
    wherein combining the plurality of status indicator values comprises combining the headset status and the video status to determine the user status of an attentiveness change of a target user;
  generating a description of the user status of the target user with respect to the conference call; and
  presenting the description of the user status.

19. The non-transitory computer readable medium of claim 18, the operations further comprising:
  detecting that the user status changed from a prior user status; and
  creating the description of the user status based on detecting that the user status changed.

* * * * *